United States Patent [19]
Langan

[11] Patent Number: 5,819,780
[45] Date of Patent: Oct. 13, 1998

[54] TIRE DEVICE

[76] Inventor: Bruce J. Langan, 1470 Hiram Ave., Holbrook, N.Y. 11741

[21] Appl. No.: 843,131

[22] Filed: Apr. 28, 1997

Related U.S. Application Data

[63] Continuation of Ser. No. 514,847, Aug. 14, 1995, abandoned.

[51] Int. Cl.$^6$ .............................. F16K 15/20; B65D 85/20
[52] U.S. Cl. ....................... 137/230; 137/539; 137/614.2; 251/149.4; 206/302; 206/443
[58] Field of Search ..................................... 137/230, 539, 137/614.2; 251/149.4; 206/302, 443

[56] References Cited

U.S. PATENT DOCUMENTS

| | | | |
|---|---|---|---|
| 837,772 | 12/1906 | Arnold | 137/230 |
| 1,082,182 | 12/1913 | Van Winkle | 137/230 X |
| 1,086,550 | 2/1914 | Morrison | 137/230 X |
| 1,121,232 | 12/1914 | Davis | 206/443 X |
| 1,239,022 | 8/1917 | McLean | 137/230 |
| 1,435,312 | 11/1922 | Kraft | 206/302 |
| 1,851,987 | 3/1932 | Gilfillan et al. | 206/302 |
| 2,505,949 | 5/1950 | De Vilbiss | 137/230 |
| 2,954,796 | 10/1960 | Marshall | 137/539 X |
| 4,434,890 | 3/1984 | Sieck et al. | 206/443 |
| 4,932,533 | 6/1990 | Collier | 206/443 X |
| 5,337,894 | 8/1994 | Ivey | 206/443 X |

FOREIGN PATENT DOCUMENTS

| | | | |
|---|---|---|---|
| 562080 | 8/1923 | France | 137/230 |
| 23738 | of 1912 | United Kingdom | 206/302 |
| 698603 | 10/1953 | United Kingdom | 206/302 |

*Primary Examiner*—John Rivell

[57] ABSTRACT

A tire device for controlled vehicle tire deflation including, a hollow rod having a top end, a bottom end, an exterior surface being knurled, and a hole therethrough having an upper portion adjacent the top end and a lower portion adjacent the bottom end capable of engaging a tire valve; a hollow set screw having a rounded head with a hex opening therethrough and an elongated body positionable in the upper portion of the hole of the rod; a valve depressor disposed inside the rod having an interior end with three support bars extending therefrom spaced away from the lower portion of the hole and an exterior end spaced within the lower portion of the hole capable of engaging a needle valve of a tire valve assembly; and a valve positioned within the rod having a spring with an upper limit being in communication with the set screw and a lower limit, a resilient supporting structure with a seat end and a base end being in communication with the support bars of the valve depressor, and a sphere therebetween being in communication with the lower limit of the spring and the seat of the supporting structure.

14 Claims, 5 Drawing Sheets

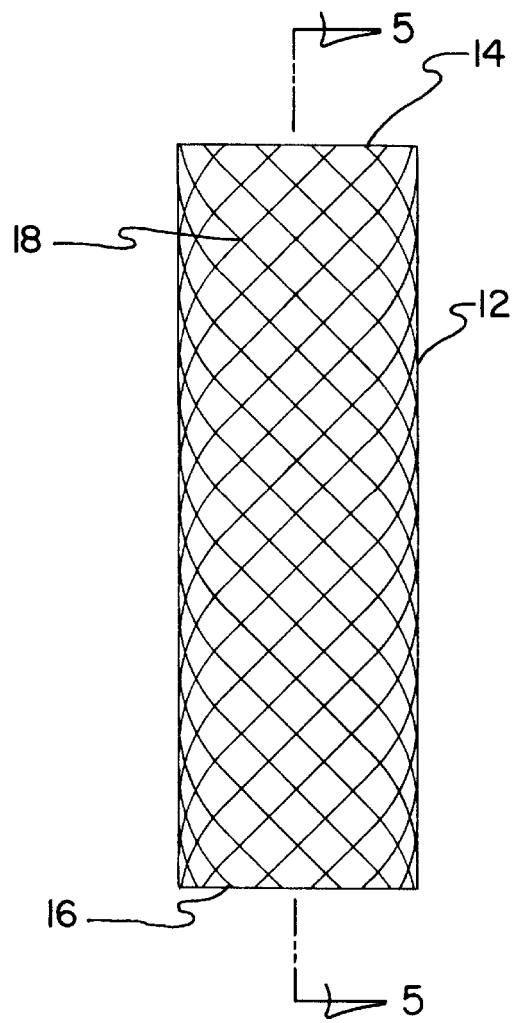
FIG. 2
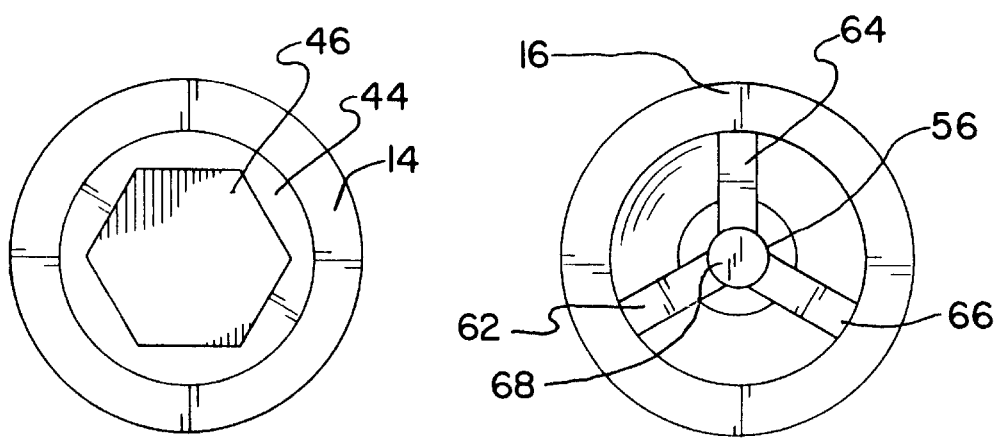
FIG. 3
FIG. 4

TIRE DEVICE

This application is a Continuation of application Ser. No. 08/514,847, filed Aug. 14, 1995 now abandoned.

BACKGROUND OF THE INVENTION

1. Field of the Invention

The present invention relates to a tire device and more particularly pertains to allowing a tire to be deflated to a preset air pressure needed to operate a vehicle in a variety of weather and terrain conditions when the tire device is screwed onto the tire valve stem to engage the needle valve and further allowing ready use when the tire device is provided in a set of four in a carrying case to be stored in the vehicle at all times.

2. Description of the Prior Art

The use of tire pressure regulators is known in the prior art. More specifically, tire pressure regulators heretofore devised and utilized for the purpose of gauging tire pressure are known to consist basically of familiar, expected, and obvious structural configurations, notwithstanding the myriad of designs encompassed by the crowded prior art which has been developed for the fulfillment of countless objectives and requirements.

By way of example, U.S. Pat. Des. No. 243,391 to Schmidt discloses a tire valve extender. U.S. Pat. No. 4,554,527 to Muller discloses a tire height sensor with valve stem attaching transmitter module. U.S. Pat. No. 5,201,968 to Renier discloses a tire pressuring and regulating apparatus. U.S. Pat. No. 5,275,196 to Mitchell and Mitchell discloses a pressure relief valve for tire rim. Lastly, U.S. Pat. No. 5,289,161 to Huang discloses a tire pressure indicator.

In this respect, the tire device according to the present invention substantially departs from the conventional concepts and designs of the prior art, and in doing so provides an apparatus primarily developed for the purpose of allowing a tire to be deflated to a preset air pressure needed to operate a vehicle in a variety of weather and terrain conditions when the tire device is screwed onto the tire valve stem to engage the needle valve and further allowing ready use when the tire device is provided in a set of four in a carrying case to be stored in the vehicle at all times.

Therefore, it can be appreciated that there exists a continuing need for a new and improved tire device which can be used for allowing a tire to be deflated to a preset air pressure needed to operate a vehicle in a variety of weather and terrain conditions when the tire device is screwed onto the tire valve stem to engage the needle valve and further allowing ready use when the tire device is provided in a set of four in a carrying case to be stored in the vehicle at all times. In this regard, the present invention substantially fulfills this need.

SUMMARY OF THE INVENTION

In view of the foregoing disadvantages inherent in the known types of tire pressure regulators now present in the prior art, the present invention provides an improved tire device. As such, the general purpose of the present invention, which will be described subsequently in greater detail, is to provide a new and improved tire device and method which has all the advantages of the prior art and none of the disadvantages.

To attain this, the present invention essentially comprises, in combination, a hollow cylindrical rod of rigid material having a top end, a bottom end, an exterior surface being knurled and an axial hole therethrough. The rod has a diameter of about ½ inch and a length of about 2¼ inch. The hole has an upper portion adjacent the top end of the rod with an upper internal threaded portion. The hole further has a lower portion adjacent the bottom end of the rod with a lower internal threaded portion. The lower internal threaded portion has a thread size of about 5/16×32 for engaging an external threaded portion of a tire valve. A generally cylindrical hollow set screw is included. The set screw has a rounded head with a hex opening therethrough and an elongated body with a external threaded portion capable of engaging the upper internal threaded portion of the hole of the rod. The screw is formed of a rigid material and has a length equal to the length of the upper internal threaded portion of the hole. The opening is capable of receiving therein an instrument for calibration of the screw within the hole of the rod. A generally rectangular longitudinal valve depressor of rigid material is provided. The valve depressor is disposed inside the rod having an interior end with three horizontal linear support bars extending therefrom and an exterior end spaced within the lower internal threaded portion of the hole. Each support bar is spaced away from the lower internal threaded portion of the hole. The exterior end is capable of engaging a needle valve of a tire valve assembly, when an external force rotates the rod causing the lower internal threaded portion to rotatable engage the external threaded portion of the tire valve. Lastly, a check valve is included. The check valve has a first end and a second end positioned within the rod with a calibrated spring at the first end, a resilient supporting structure at the second end and a rigid sphere therebetween. The spring, at an upper limit, is in communication with the body of the set screw and at a lower limit in communication with the sphere. The spring is capable of opening and closing at the upper limit with a first preset pressure supplied by calibrating the set screw. The spring further is capable of opening and closing at the lower limit with a second preset pressure supplied by the sphere. The resilient supporting structure has a seat end and a base end being in communication with the three support bars of the valve depressor. The sphere when in a resting position being seated on the seat end of the supporting structure. The sphere further capable of pushing the spring at the lower limit when a pressurized air lifts the sphere off the seat of the supporting structure by release of the air from a tire when the valve depressor engages the needle valve of the tire valve assembly. The pressurized air being released in set amounts as determined by the first preset pressure against the upper limit of the spring supplied by the set screw.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved tire device which has all of the advantages of the prior art tire pressure regulators and none of the disadvantages.

It is another object of the present invention to provide a new and improved tire device which may be easily and efficiently manufactured and marketed.

It is further object of the present invention to provide a new and improved tire device which is of durable and reliable constructions.

An even further object of the present invention is to provide a new and improved tire device which is susceptible of a low cost of manufacture with regard to both materials and labor, and which accordingly is then susceptible of low prices of sale to the consuming public, thereby making such tire device economically available to the buying public.

Still yet another object of the present invention is to provide a new and improved tire device which provides in the apparatuses and methods of the prior art some of the advantages thereof, while simultaneously overcoming some of the disadvantages normally associated therewith.

Even still another object of the present invention is to provide a new and improved tire device for allowing a tire to be deflated to a preset air pressure needed to operate a vehicle in a variety of weather and terrain conditions when the tire device is screwed onto the tire valve stem to engage the needle valve and further allowing ready use when the tire device is provided in a set of four in a carrying case to be stored in the vehicle at all times.

Lastly, it is an object of the present invention to provide a new and improved tire device for controlled vehicle tire deflation comprising a hollow rod having a top end, a bottom end, an exterior surface being knurled, and an axial hole therethrough having an upper portion adjacent the top end and a lower portion adjacent the bottom end capable of engaging a tire valve; a hollow set screw having a rounded head with a hex opening therethrough and an elongated body positionable in the upper portion of the hole of the rod; a longitudinal valve depressor disposed inside the rod having an interior end with three linear support bars extending therefrom spaced away from the lower portion of the hole and an exterior end spaced within the lower portion of the hole capable of engaging a needle valve of a tire valve assembly; and a valve positioned within the rod having a calibrated spring with an upper limit being in communication with the set screw and a lower limit, a resilient supporting structure with a seat end and a base end being in communication with the support bars of the valve depressor, and a sphere therebetween being in communication with the lower limit of the spring and the seat of the supporting structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an elevational view of the present invention.

FIG. 3 is a top plan view of the present invention to an enlarged scale.

FIG. 4 is a bottom plan view of the present invention to an enlarged scale.

The same reference numerals refer to the same parts through the various Figures.

DESCRIPTION OF THE PREFERRED EMBODIMENT

Figure 1:
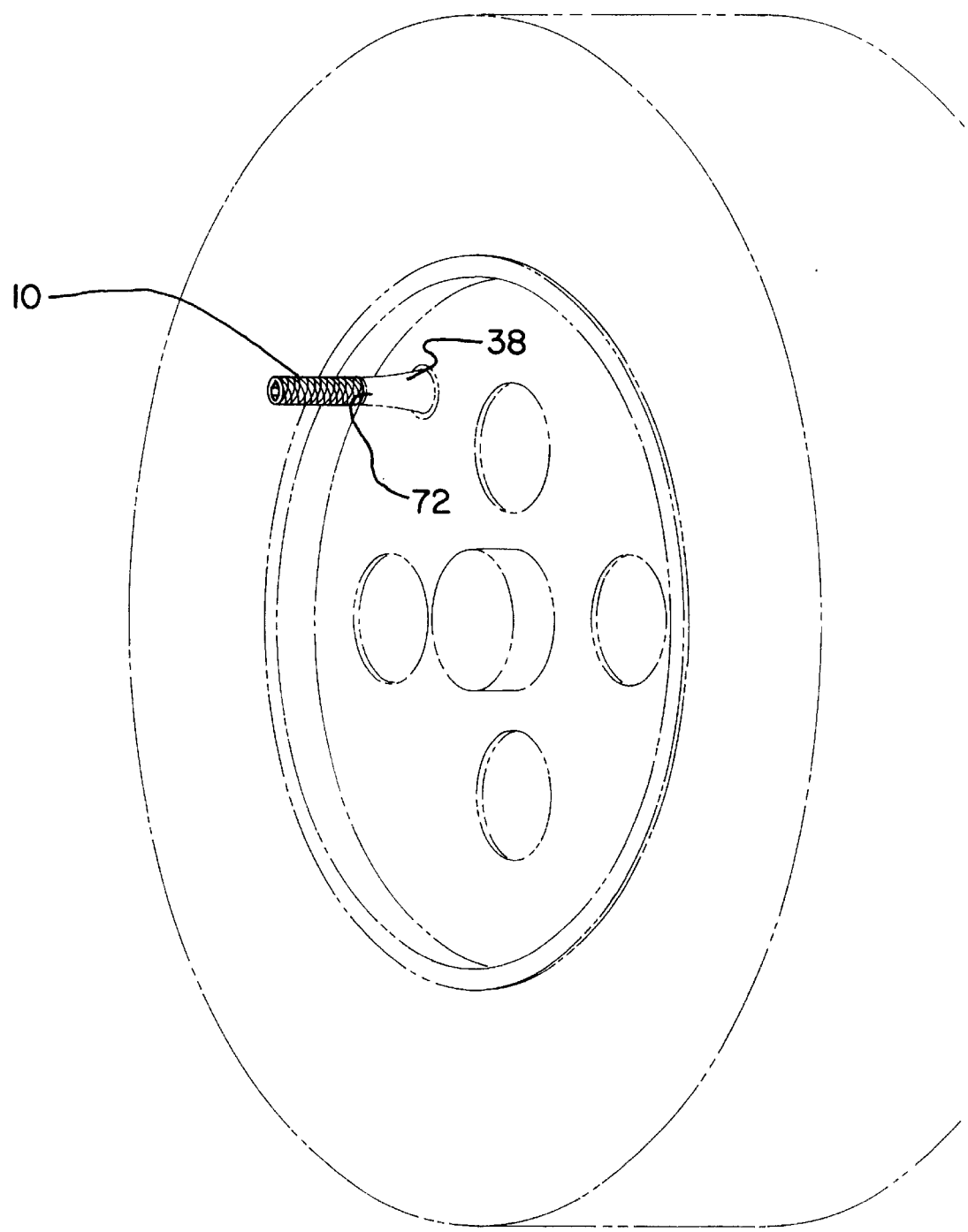
FIG. 1 is a perspective view of the preferred embodiment of the tire device constructed in accordance with the principles of the present invention.

With reference now to the drawings, and in particular to FIG. 1 thereof, the preferred embodiment of the new and improved tire device embodying the principles and concepts of the present invention and generally designated by the reference numeral 10 will be described.

The present invention, the tire device 10 is comprised of a plurality of components. Such components in their broadest context include a rod, a set screw, a valve depressor, and a check valve. Such components are individually configured and correlated with respect to each other so as to attain the desired objective.

Figure 6:
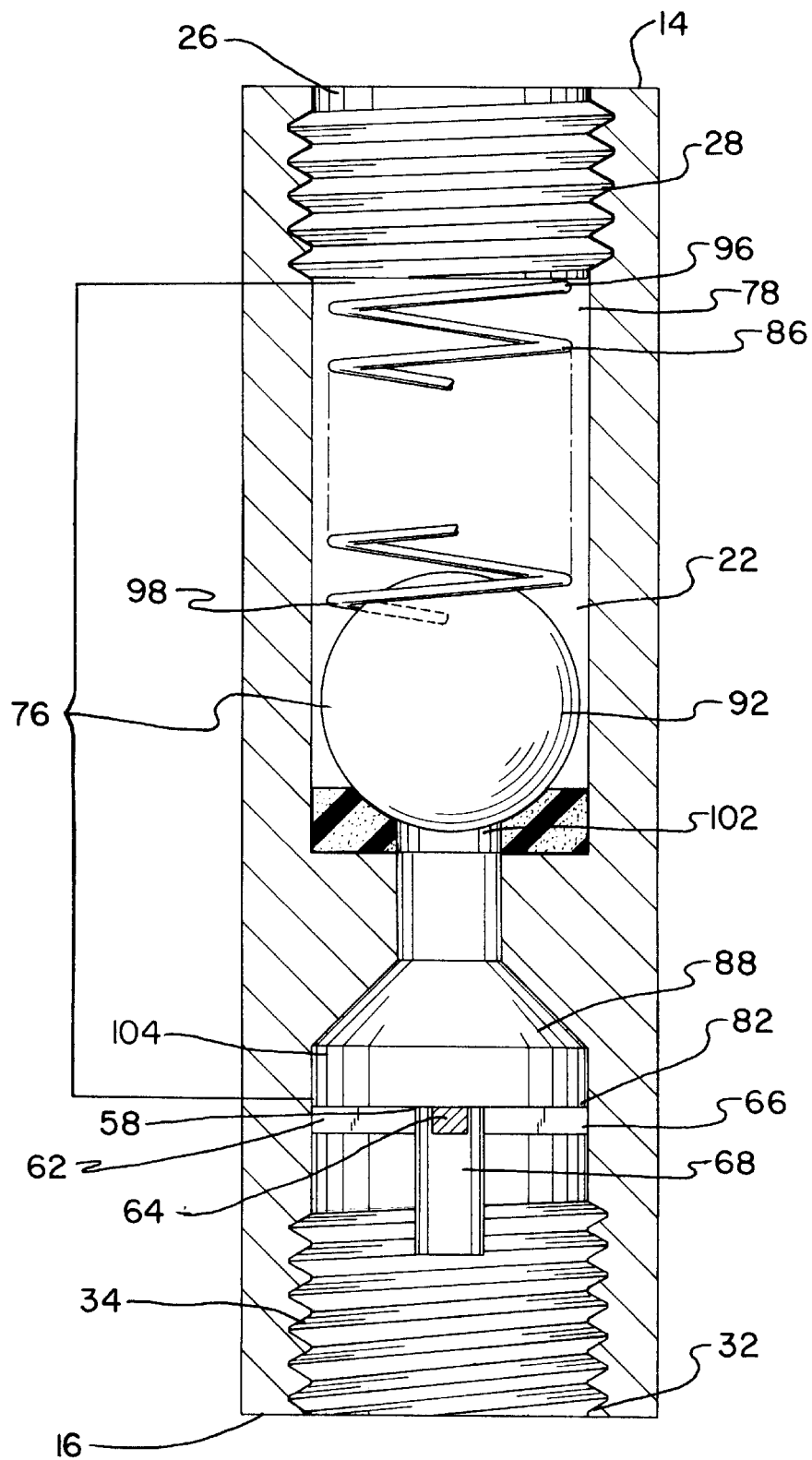
FIG. 6 is a sectional view of the present invention taken along line 5—5 of FIG. 2.

Specifically, the present invention includes a hollow cylindrical rod 12. The rod is formed of rigid material such as aluminum or alloy thereof. The rod has a top end 14, a bottom end 16 and an exterior surface 18 being knurled as shown in FIG. 2. The exterior surface is knurled to assist the user in gripping the device. Also the rod has an axial hole 22 therethrough as shown in FIG. 6. The rod has a diameter of about ½ inch and a length of about 2¼ inch. As best illustrated in FIG. 6, the hole has an upper portion 26 adjacent the top end of the rod with an upper internal threaded portion 28. The hole further having a lower portion 32 adjacent the bottom end of the rod having a lower internal threaded portion 34. The lower internal threaded portion having a thread size being about 5/16×32 for engaging an external threaded portion of a tire valve 38 as shown in FIG. 1.

Figure 5:
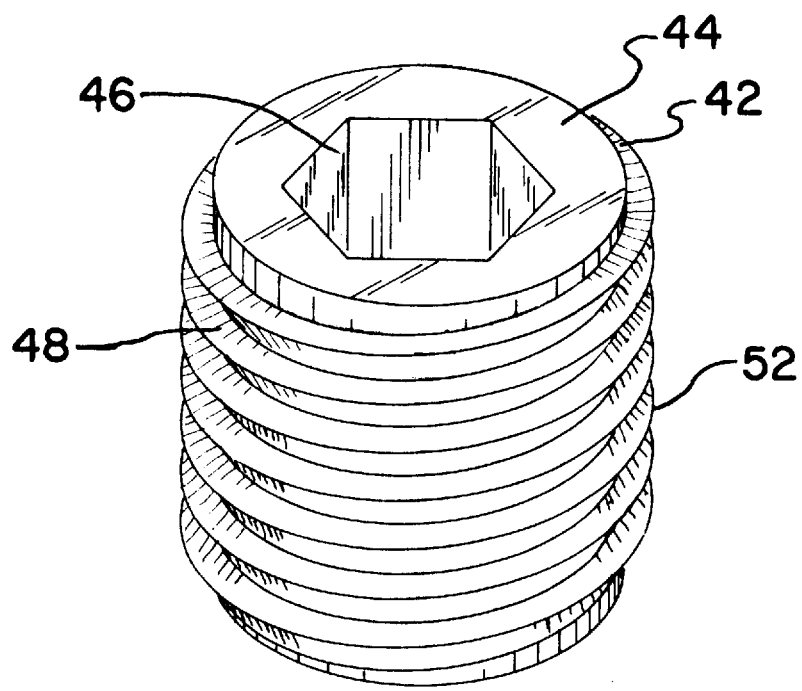
FIG. 5 is a longitudinal view of the set screw of the present invention.

Also included is a generally cylindrical hollow set screw 42 as shown in FIG. 5. The screw has a rounded head 44 with a hex opening 46 therethrough and an elongated body 48 with a external threaded portion 52 capable of engaging the upper internal threaded portion 28 of the hole 22 of the rod 12. FIG. 3 depicts the head and hex opening of the screw. The screw is formed of a rigid material such as metal. The screw has a length equal to the length of the upper internal threaded portion of the hole. The opening 46 is capable of receiving therein an instrument for calibration of the screw within the hole of the rod.

A generally rectangular longitudinal valve depressor 56 is included a shown in FIG. 6. The valve depressor of rigid material such as a metal or metal alloy. The valve is disposed inside the rod 12 and has an interior end 58 with three horizontal linear support bars 62, 64 and 66, extending therefrom and an exterior end 68 spaced within the lower internal threaded portion 34 of the hole 22. Each support bar being spaced away from the lower internal threaded portion 34 of the hole. FIG. 4 in a illustration of the valve depressor and the three support bars as seen from the bottom of the device. The exterior end 68 is capable of engaging a needle valve of a tire valve assembly 72 when an external force rotates the rod and causes the lower internal threaded portion to rotatable engage the external threaded portion of the tire valve 38. The rod completely engages the tire valve at its external threaded portion thus allowing the valve depressor to engage the needle valve of the tire valve assembly.

Lastly, a check valve is included as shown in FIG. 6. The check valve having a first end 78 and a second end 82 positioned within the rod 12 with a calibrated spring 86 at the first end, a resilient supporting structure 88 at the second end and a rigid sphere 92 therebetween. The spring at an upper limit 96 being in communication with the body of the set screw and at a lower limit 98 in communication with the sphere. The spring being capable of opening and closing at the upper limit with a first preset pressure supplied by calibrating the set screw 42. The spring further being capable of opening and closing at the lower limit with a second preset pressure supplied by the sphere. The spring 86 is formed of a resilient metal or metal alloy. The resilient supporting structure has a seat end 102 and a base end 104 being in communication with the three support bars 62, 64, and 66, of the valve depressor 56 as shown in FIG. 6. The sphere when in a resting position being seated on the seat end of the supporting structure as depicted in FIG. 6. The sphere further is capable of pushing the spring at the lower limit when a pressurized air lifts the sphere off the seat of the supporting structure by the air released from a tire when the valve depressor engages the needle valve of the tire valve assembly. The pressurized air is released in set amounts as determined by the first preset pressure against the upper limit of the spring supplied by the set screw 42. Calibration of the set screw can be done by the manufacture or by the user to facilitate a predetermined amount or air to be released from the tire.

Figure 7:
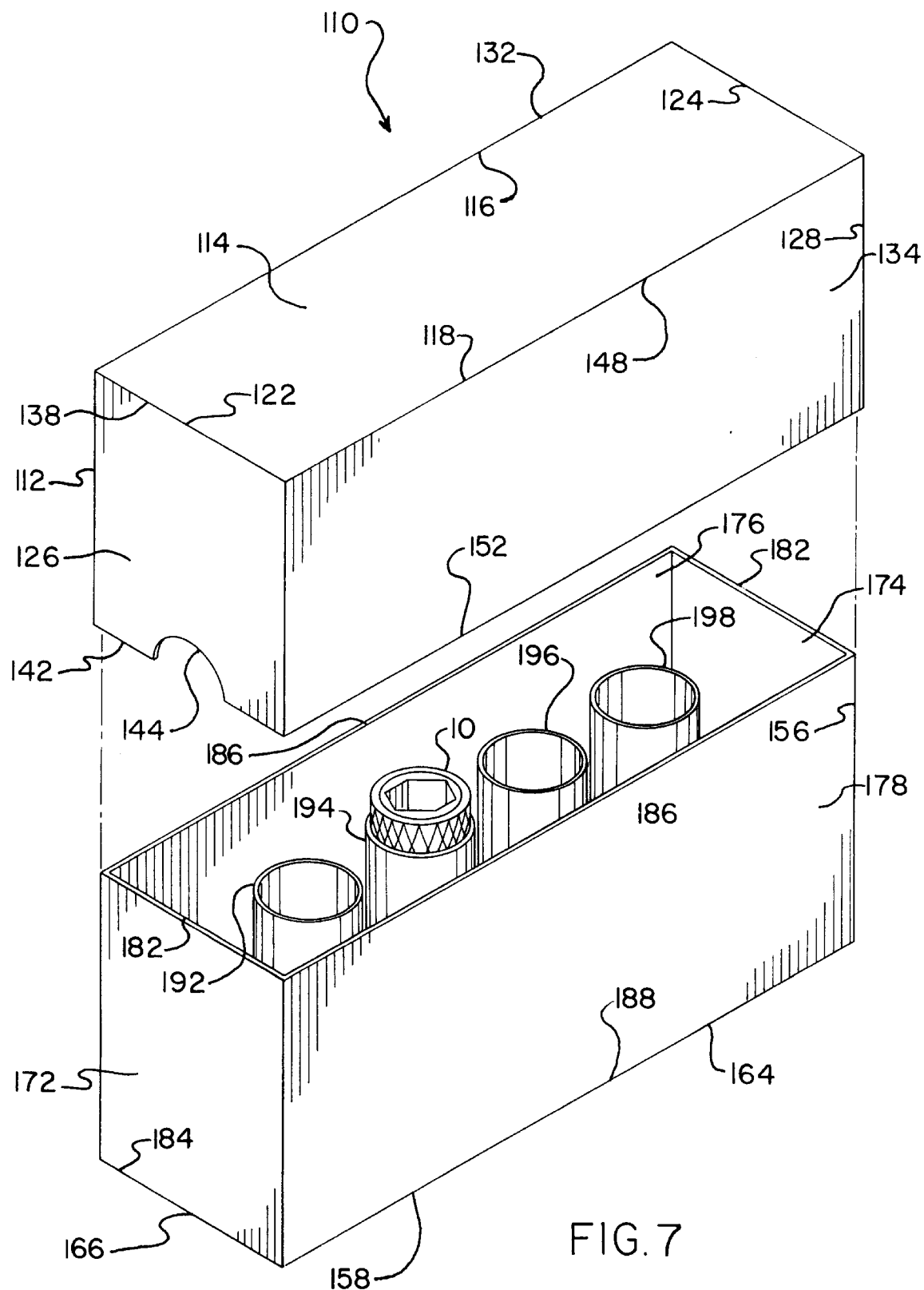
FIG. 7 is an exploded view of a case containing the present invention.

To store the tire device for carrying in a vehicle a tire device case 110 for containing four tire devices 10 is included as shown in FIG. 7. The case is made of plastic or paper. The case is formed of a generally rectangular upper shell 112 with a top portion 114 having a periphery formed of a pair of long edges 116 and 118, with a pair of short edges 122 and 124, extended therebetween and a pair of spaced opposed end walls 126 and 128, and a pair of spaced opposed rectangular side walls 132 and 134. Each end wall has a top edge 138 hingeably coupled to one of the short edges of the top portion and a bottom edge 142 having a concave indentation 144. Each side wall has a top edge 148 hingeably coupled to one of the long edges of the top portion and a bottom edge 152. Each sidewall and each end wall have a height of about 2½ inches.

Lastly, a lower shell 156 is included as shown in FIG. 7. The lower shell has a generally rectangular configuration formed of paper of plastic The lower shell has a bottom portion 158 having a periphery formed of a pair of long edges 162 and 164, with a pair of short edges 166 and 168, extended therebetween and a pair of spaced opposed end walls 172 and 174 and a pair of spaced opposed rectangular side walls 176 and 178. Each end wall has a top edge 182 and a bottom edge 184 hingeably coupled to one of the short edges of the bottom portion. Each side wall having a top edge 186 and a bottom edge 188 hingeably coupled to one of the long edges of the bottom portion. Each side wall and each end wall have a height of about 2½ inches. The bottom portion further including four cylindrical shells 192, 194, 196 and 198, extending upward from an interior surface of the bottom portion. Each cylinder having a length of about 2 inches and a diameter of a size for slidable receipt of a set of four tire devices. The lower shell being capable of being contained within the upper shell. The indentations allow the user to grasp the upper shell and to slide the upper shell form over the lower shell. The carrying case may be held in the glove compartment, the trunk or under the seat of the vehicle.

The present invention is a tire device that has a self-locking set screw for adjusting a spring loaded rubber seated check valve which enables it to be preset for release of tire pressure. The tire device is made of an 2¼ inch knurled aluminum rod with a half inch outside diameter. The tire device is machined to house a quarter inch steel ball, medium heavy spring and a rubber seat. The tire device is capped with a hollow set screw. The tire device can be calibrated. The underside of the tire device is tapped with 5/16×32 thread size and a valve depressor installed inside above the threads. The tire device is screwed onto a tire valve and releases the air. The air blows by the check valve until the desired PSI is reached. The check valve closes automatically when the desired PSI is reached. The tire device is then removed. The tires are now ready to be driven on snow, sand or rough terrain. The tire device may be carried in the vehicle at all times. They can be provided as a set of four tire devices in a case, with each having the same preset calibration. All four can be place on the tires at the same time and release the same amount of air in the tires. The present invention thus provides a tire device that can easily be used and stored.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to-limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A tire device for controlled vehicle tire deflation when the tire device is placed on a tire valve and engages a needle valve of a tire valve assembly comprising, in combination:

a hollow cylindrical rod of rigid material having a top end, a bottom end, an exterior surface being knurled and an axial hole therethrough, the rod having a diameter of about ½ inch and a length of about 2¼ inch, the hole having an upper portion adjacent the top end of the rod with an upper internal threaded portion, the hole further having a lower portion adjacent the bottom end of the rod having a lower internal threaded portion, the lower internal threaded portion having a thread size being about 5/16×32 for engaging an external threaded portion of a tire valve;

a generally cylindrical hollow set screw having a rounded head with a hex opening therethrough and an elongated body with a external threaded portion capable of engaging the upper internal threaded portion of the hole of the rod, the screw formed of a rigid material having a length equal to the length of the upper internal threaded portion of the hole, the opening capable of receipt therein an instrument for calibration of the screw within the hole of the rod;

a generally rectangular longitudinal valve depressor of rigid material disposed inside the rod having an interior end with three horizontal linear support bars extending therefrom and an exterior end spaced within the lower internal threaded portion of the hole, each support bar being spaced away from the lower internal threaded portion of the hole, the exterior end capable of engaging a needle valve of a tire valve assembly when an external force rotates the rod causing the lower internal threaded portion to rotatable engage the external threaded portion of the tire valve; and a check valve having a first end and a second end positioned within the rod with a calibrated spring at the first end, a resilient supporting structure at the second end and a rigid sphere therebetween, the spring at an upper limit being in communication with the body of the set screw and at a lower limit in communication with the sphere, the spring being capable of opening and closing at the upper limit with a first preset pressure supplied by calibrating the set screw, the spring further being capable of opening and closing at the lower limit with a second preset pressure supplied by the sphere, the resilient supporting structure having a seat end and a base end being in communication with the three support bars of the valve depressor, the sphere when in a resting position being seated on the seat end of the supporting structure, the sphere further capable of pushing the spring at the lower limit when a pressurized air lifts the sphere off the seat of the supporting structure by release of the air from a tire when the valve depressor engages the needle valve of the tire valve assembly, the pressurized air being released in set amounts as determined by the first preset pressure against the upper limit of the spring supplied by the set screw.

2. A tire device for controlled vehicle tire deflation comprising:

a hollow rod having a top end, a bottom end, an exterior surface being knurled, and an axial hole therethrough having an upper portion adjacent the top end and a lower portion adjacent the bottom end capable of engaging a tire valve;

a hollow set screw having a rounded head with a hex opening therethrough and an elongated body positionable in the upper portion of the hole of the rod;

a longitudinal valve depressor disposed inside the rod having an interior end with three linear support bars extending therefrom spaced away from the lower portion of the hole and an exterior end spaced within the lower portion of the hole capable of engaging a needle valve of a tire valve assembly; and a valve positioned within the rod having a calibrated spring with an upper limit being in communication with the set screw and a lower limit, a resilient supporting structure with a seat end and a base end being in communication with the support bars of the valve depressor, and a sphere therebetween being in communication with the lower limit of the spring and the seat of the supporting structure.

3. A tire device as set forth in claim 2 wherein the rod being cylindrical in configuration and formed of a rigid material has a diameter of about ½ inch and a length of about 2¼ inch.

4. A tire device as set forth in claim 2 wherein the upper portion of the hole has an upper internal threaded portion.

5. A tire device as set forth in claim 2 wherein the lower portion of the hole has a lower internal threaded portion with a thread size being about 5/16×32 for engaging an external threaded portion of the tire valve.

6. A tire device as set forth in claim 2 wherein the set screw is formed of a rigid material and has a generally cylindrical configuration with a length equal to the length of the upper portion of the hole.

7. A tire device as set forth in claim 2 wherein the elongated body of the set screw has external threaded portion capable of engaging an upper internal threaded portion of the hole of the rod.

8. A tire device as set forth in claim 2 wherein the opening being capable of receipt therein an instrument for calibration of the screw within the hole of the rod.

9. A tire device as set forth in claim 2 wherein the valve depressor being generally rectangular in configuration and formed of a rigid material.

10. A tire device as set forth in claim 2 wherein each linear support bar of the valve depressor being horizontal and spaced away form a lower internal threaded portion of the lower portion of the hole.

11. A tire device as set forth in claim 2 wherein the valve being a check valve having a first end with the spring therein and a second end with the supporting structure therein.

12. A tire device as set forth in claim 2 wherein the spring being capable of opening and closing at the upper limit with a first preset pressure supplied by calibrating the set screw.

13. A tire device as set forth in claim 2 wherein the spring further being capable of opening and closing at the lower limit with a second preset pressure supplied by the sphere being lifted from the seat of the support structure when a pressurized air is released for the tire as the valve depressor engages the needle valve of the tire valve assembly.

14. A tire device case for containment of four tire devices according to claim 1 comprising:

a generally rectangular upper shell with a top portion having a periphery formed of a pair of long edges with a pair of short edges extended therebetween and a pair of spaced opposed end walls and a pair of spaced opposed rectangular side walls, each end wall having a top edge hingeably coupled to one of the short edges of the top portion and a bottom edge having a concave indentation, each side wall having a top edge hingeably coupled to one of the long edges of the top portion and a bottom edge, each sidewall and each end wall having a height of about 2½ inches; and a generally rectangular lower shell with a bottom portion having a periphery formed of a pair of long edges with a pair of short edges extended therebetween and a pair of spaced opposed end walls and a pair of spaced opposed rectangular side walls, each end wall having a top edge and a bottom edge hingeably coupled to one of the short edges of the bottom portion, each side wall having a top edge and a bottom edge hingeably coupled to one of the long edges of the bottom portion, each side wall and each end wall having a height of about 2½ inches, the bottom portion further including four cylindrical shells extending upward from an interior surface of the bottom portion, each cylinder having a length of about 2 inches and a diameter of a size for slidable receipt of a set of four tire devices, the lower shell being capable of being contained within the upper shell.

* * * * *